United States Patent
Morin et al.

(10) Patent No.: US 9,569,646 B2
(45) Date of Patent: Feb. 14, 2017

(54) SMART CARD READER

(71) Applicant: OBERTHUR TECHNOLOGIES, Levallois-Perret (FR)

(72) Inventors: Nicolas Morin, Nanterre (FR); Christophe Giraud, Nanterre (FR)

(73) Assignee: OBERTHUR TECHNOLOGIES, Levallois-Perret (FR)

( * ) Notice: Subject to any disclaimer, the term of this patent is extended or adjusted under 35 U.S.C. 154(b) by 96 days.

(21) Appl. No.: 13/712,843

(22) Filed: Dec. 12, 2012

(65) Prior Publication Data

US 2014/0158764 A1    Jun. 12, 2014

(30) Foreign Application Priority Data

Dec. 12, 2011   (FR) ...................................... 11 61441

(51) Int. Cl.
*G06K 7/00*    (2006.01)
*G06F 21/55*   (2013.01)

(52) U.S. Cl.
CPC ........... *G06K 7/0008* (2013.01); *G06F 21/558* (2013.01); *G06K 7/0095* (2013.01)

(58) Field of Classification Search
USPC ....................................................... 235/437
See application file for complete search history.

(56) References Cited

U.S. PATENT DOCUMENTS

| | | | |
|---|---|---|---|
| 2008/0302877 A1* | 12/2008 | Musella ................. | G06K 19/07 235/492 |
| 2012/0005703 A1* | 1/2012 | Van De Ven .......... | H04N 7/163 725/25 |
| 2012/0102237 A1* | 4/2012 | Thill ....................... | G06F 9/445 710/13 |
| 2013/0198565 A1* | 8/2013 | Mancoridis ........... | G06F 11/008 714/26 |

FOREIGN PATENT DOCUMENTS

DE    10 2005 054 695 A1    5/2006
EP         0 881 590 A1     12/1998

* cited by examiner

*Primary Examiner* — Michael G Lee
*Assistant Examiner* — David Tardif
(74) *Attorney, Agent, or Firm* — Arent Fox LLP

(57) ABSTRACT

A smart card reader capable of transmitting a power signal to a smart card to determine a duration WT called Waiting Time in keeping with the standard ISO 7816 and sending commands to the smart card, the reader comprising a detector for detecting a malfunctioning condition of the smart card and being configured to cut the power signal when the malfunctioning condition is fulfilled. This reader is remarkable in that the malfunctioning condition is different to reaching, by a counter configured to be incremented with the time from the sending of a command to the smart card, of a value corresponding to the duration WT elapsed from the sending of the command or reinitialization of the counter in response to the receipt of a protocol message of the smart card.

10 Claims, 4 Drawing Sheets

SMART CARD READER

CROSS-REFERENCE TO RELATED APPLICATION

This application is based upon and claims the benefit of priority of the prior French Patent Application No. 1161441, filed Dec. 12, 2011, the disclosure of the prior application is hereby incorporated in its entirety by reference.

BACKGROUND OF THE INVENTION

The invention relates to the field of secure smart card components, or integrated circuit card.

When a smart card is inserted into a smart card reader, the reader supplies a power signal to the smart card. Now fed, the smart card can execute commands sent to it by the reader. The standard ISO 7816 normalises communication between a smart card reader and a smart card. Reference is made here for example to standard ISO 7816-3 section 10.2, of reference ISO/IEC JTC 1/FC 17 N2837 for example, dated Sep. 7, 2005.

In particular, this protocol provides that, when it sends a command to the card, the reader triggers a counter which is incremented progressively with time. If the counter reaches a value corresponding to the expiration of a duration called Waiting Time (WT) from the sending of the command without receipt of a response from the card, it is considered that the card will no longer respond. The reader cuts the power of the card to reinitialise it. According to the standard ISO 7816, the duration WT is calculated at each reinitialisation of the smart card component, especially as a function of the clock frequency of the communications interface ISO 7816 (between the reader and the card) applied by the reader and of the speed of communication of the communications interface ISO 7816 negotiated during initialisation. For example, the duration WT is equal to 714 ms for a frequency of 5 MHz and a default communication speed (that is, the speed according to which the duration of a bit on the communications interface ISO 7816 is equal to 372 clock strikes). During execution of a command requiring more than the duration WT, the card can periodically send a predetermined message, called protocol byte, to request more time from the reader. According to the standard ISO 7816, this is an byte 0x60. In response on receipt of the protocol byte, the reader reinitialises the counter.

This mechanism proposes an effective response to blockage of a card during its "normal" use.

However, this mechanism can pose a problem for a card undergoing attacks. It is known that to secure the operating of a smart card component, for example a microcontroller, manufacturers use security locks implanted in the code of the component. An attack by a fault injection consists of perturbing the component to divert it from its normal behaviour and try to make it "jump" its security locks. Such an attack by fault injection is achieved for example by sending a light pulse to the smart card component at an instant corresponding to the execution of a determined instruction.

To test the security of its smart cards facing such attacks, a smart-card manufacturer can be encouraged to carry out attacks himself, or to have attacks carried out by a third party, for example a certification organisation.

During an attack by fault injection, injected errors completely divert the component and the latter can be prompted to execute a code different to that provided by the developer of an application. It often happens that the card executes a code loop whereof the execution is never terminated due to an injected fault: this is called an infinite loop. This can happen if for example the injected fault modifies the output condition of the loop. If the output condition can no longer be retrieved in the code, the card will then stay in its loop.

In parallel with continuous execution of this code loop, the card automatically sends the protocol byte (byte 0x60) to request a time extension. This iteration prevents the reader from taking over. The reader therefore remains in wait status.

The standard ISO 7816 proposes no mechanism for reacting when the card executes such an infinite loop.

However, this type of situation occurs frequently when the attempt is made to validate the resistance of implementation against attacks by fault injection. In this case, the sole solution for continuing analysis for the evaluator is to manually take the card from the reader and reinsert it. This loses much time when the evaluator is conducting manual attacks (because the reader and the card are located in a protective caisson containing the laser, the fact of removing the card and reinserting it requires the evaluator to respect strict procedure since it is extremely dangerous to be exposed to laser beams).

This is even more problematic when automatic attacks are launched (throughout a night, for example) since when perturbation generates an infinite loop the attacks stop and the evaluator therefore loses much time. This happens frequently during attacks by fault injections and remains a major problem.

SUBJECT MATTER AND SUMMARY OF THE INVENTION

The present invention proposes a smart card reader capable of determining a duration WT called Waiting Time in keeping with the standard ISO 7816 and of sending commands to the smart card, the reader comprising a detector for detecting a malfunctioning condition of the smart card and being configured to command reinitialisation of the smart card when the malfunctioning condition is fulfilled. This reader is remarkable in that said malfunctioning condition is different to reaching, by a counter configured to be incremented with the time from the sending of a command to the smart card, by a value corresponding to the duration WT elapsed from sending of the command or reinitialisation of the counter in response to the receipt of a protocol message of the smart card.

Correlatively, the invention proposes a power process utilised by a smart card reader capable of determining a duration WT called Waiting Time in keeping with the standard ISO 7816 and sending commands to the smart card, comprising the steps consisting of:
  detecting a malfunctioning condition of the smart card, and
  commanding reinitialisation of the smart card when the malfunctioning condition is fulfilled.

This power process is remarkable in that said malfunctioning condition is different to reaching, by a counter configured to be incremented with the time from the sending of a command to the smart card, a value corresponding to the duration WT elapsed from the sending of the command or the reinitialisation of the counter in response to the receipt of a protocol message of the smart card.

Because of a these characteristics, the reader can detect dysfunction of the card in a manner other than that provided in the standard ISO 7816. It is therefore possible for the reader to detect dysfunction and to reinitialise the card by cutting the power signal when the card executes an infinite loop.

Therefore, when attacks by fault injections are made which can cause an infinite loop, it is not necessary to reinitialise the card by removing it from the reader then reinserting it.

The reader is capable for example of transmitting a power signal to a smart card and commanding reinitialisation of the smart card by cutting the power signal.

Several conditions can detect such dysfunction.

Therefore, in a first embodiment, the reader comprises a counter configured to be incremented with the time from the sending of a command to the smart card, in which said malfunctioning condition is reached, by said counter, by a value corresponding to a period less than the duration WT elapsed from the sending of the command, without receipt of a response from the smart card.

In a second embodiment, the malfunctioning condition is the receipt of a predetermined number of protocol messages from the smart card.

In a third embodiment, the reader comprises a first counter and a second counter configured to be incremented with the time from the sending of a command to the smart card, in which said malfunctioning condition comprises reaching, by said first counter, a value corresponding to the duration WT elapsed from the sending of the command or the reinitialisation of the counter in response to the receipt of a protocol message from the smart card, without receipt of a response from the smart card, the malfunctioning condition also comprising reaching, by the second counter, a value corresponding to a period different to the duration WT elapsed from the sending of the command, without receipt of a response from the smart card.

The malfunctioning condition can comprise the receipt of a cutting message originating from an infinite loop detection device. The invention also proposes a system comprising a smart card reader according to the invention and an infinite loop detection device capable of sending a cutting message to the smart card reader.

Therefore, in a embodiment which can be considered as a variant of the third embodiment above in which the second counter is placed in an external device, the loop-detection device comprises a counter configured to be incremented with the time from the sending of a command of the reader to a smart card, the infinite loop detection device being configured to send said cutting message when the counter reaches a value corresponding to a period different to the duration WT elapsed from the sending of the command.

In a fourth embodiment, the infinite loop detection device is configured to detect execution of an infinite loop by a smart card as a function of an analysis signal originating from the smart card and for sending the cutting message in response to said detection.

The system can also comprise a smart card configured to regularly send protocol bytes 0x60 of the standard ISO 7816 during execution of a command requiring more time than the duration WT.

BRIEF DESCRIPTION OF THE DRAWINGS

Other characteristics and advantages of the present invention will emerge from the following description, in reference to the attached drawings which illustrate an exemplary embodiment devoid of any limiting character. In the figures.

DETAILED DESCRIPTION OF EMBODIMENTS

Figure 1:
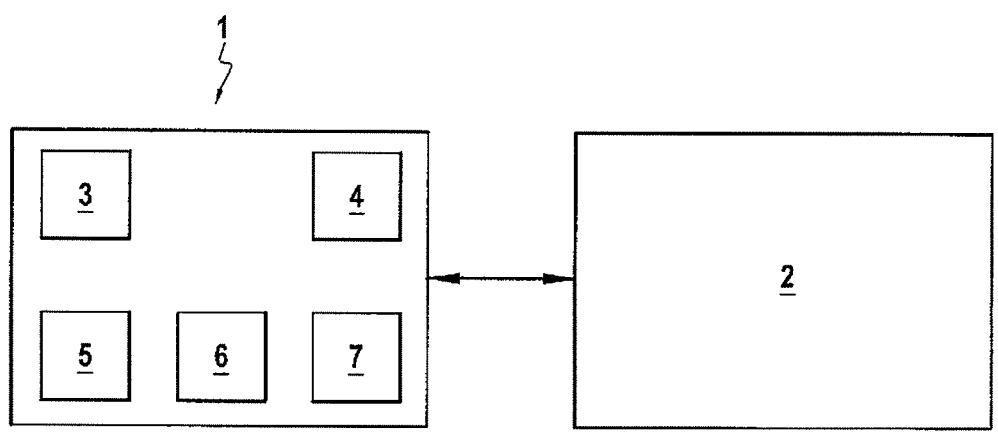
FIG. 1 illustrates a smart card reader according to the invention, and a smart card.

FIG. 1 illustrates a smart card reader 1 and a smart card 2 connected to the reader. In this situation, the reader 1 provides a power signal to the smart card 2 and can transmit commands to the smart card 2.

The smart card 2 is designed to communicate with the reader 1 in keeping with the standard ISO 7816. Therefore, during initialisation of the smart card 2, the reader 1 determines a duration WT (Waiting Time) in keeping with the standard ISO 7816 and, when it receives from the reader 1 a command whereof the execution needs a duration greater than the duration WT, the smart card 2 sends, in line with the execution of the command, a protocol byte (byte 0x60) to the reader 2 periodically, at a period slightly less than the duration WT.

The reader 1 exhibits the material architecture of a computer and comprises especially a microprocessor 3, non-volatile memory 4, volatile memory 5, a communications interface 6 with the smart card 2 and a communications interface 7 with another device (for example a personal computer).

Hereinbelow, several embodiments of the reader 1 are described in detailing the operating of the reader 1. It should be understood that each operating described could correspond to the execution, by the microprocessor 3, of a computer program stored in non-volatile memory 4 by using the volatile memory 4.

Figure 2:
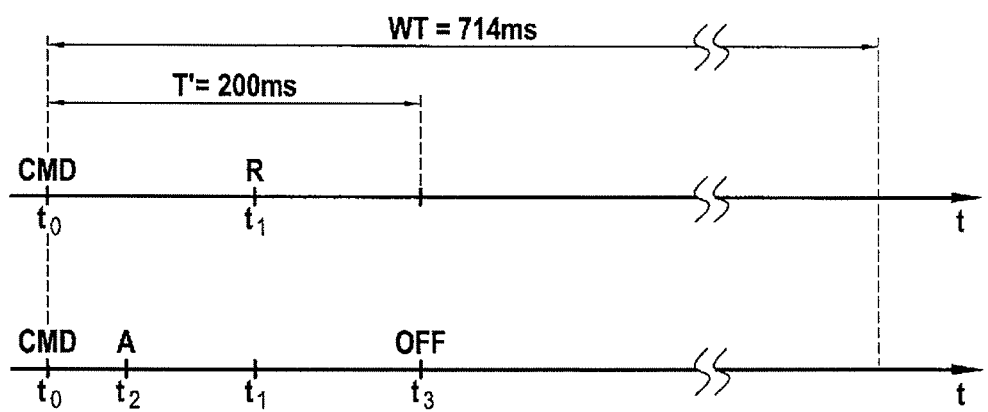
FIG. 2 illustrates two timelines illustrating the operation of the reader of FIG. 1, in keeping with a first embodiment of the invention.

In a first embodiment, whereof the operating is illustrated in FIG. 2, the reader 1 comprises a counter configured to be incremented with the time. The reader 1 triggers the counter during the sending of a command to the smart card 2 and reinitialises the counter in response to the receipt of a protocol byte M of the smart card 1. When the counter reaches a predetermined value without receipt of a response from the smart card 2 or from the protocol byte M, the reader 1 cuts the power signal of the smart card 1. The operating of the reader 1 of this embodiment is therefore similar to that of the reader of the prior art cited at the outset. However, in this case the predetermined duration T' after which the reader 1 cuts the power signal is less than the duration WT determined during initialisation of the smart card 2. For example, the duration T' is equal to 200 ms and the duration WT determined is equal to 714 ms.

The operating of the reader 1 is illustrated in FIG. 2.

The upper timeline of FIG. 2 corresponds to the operating of the card 1 in the absence of attack. The reader 1 sends a command CMD at the instant $t_0$ and triggers its counter. The command CMD needs a time of execution substantially less than the duration WT. For example this is a command of the execution of an algorithm RSA, requiring around 100 ms.

The smart card 1 executes the command CMD received and responds via a response R. The response R is therefore received by the reader 1 at the instant $t_1$, environ 100 ms after the envoi of the command CMD. As at the instant $t_1$, the duration T' has not yet expired, the reader 1 does not cut the power signal of the smart card 2.

The lower timeline corresponds to cases where the smart card 2 undergoes an attack the effect of which is to have it execute an infinite loop. The reader 1 also sends the command CMD at the instant $t_0$ and triggers its counter. Then, at the instant $t_2$, the smart card 2 undergoes an attack and enters an infinite loop. The smart card 2 therefore does not fully execute the command CMD received and does not respond via a response R at the instant $t_1$.

The reader 1 notes, at the instant $t_3$, the expiration of the duration T' without receipt of a response R or of a protocol byte M from the smart card 1. In fact, since the smart card 2 is designed to communicate according to the standard ISO 7816, any protocol byte M sent by the smart card 1 would have been sent just prior to expiration of the duration WT, therefore after the instant $t_3$. Therefore, at the instant $t_3$, the reader 1 cuts the power of the smart card 2 to reinitialise it. The infinite loop is therefore interrupted.

In this embodiment, the reader 1 therefore carries out attacks on a smart card 1 which has been asked to execute a command whereof the execution duration is less than the duration WT, while preventing the card from entering an uninterrupted infinite loop.

Figure 3:
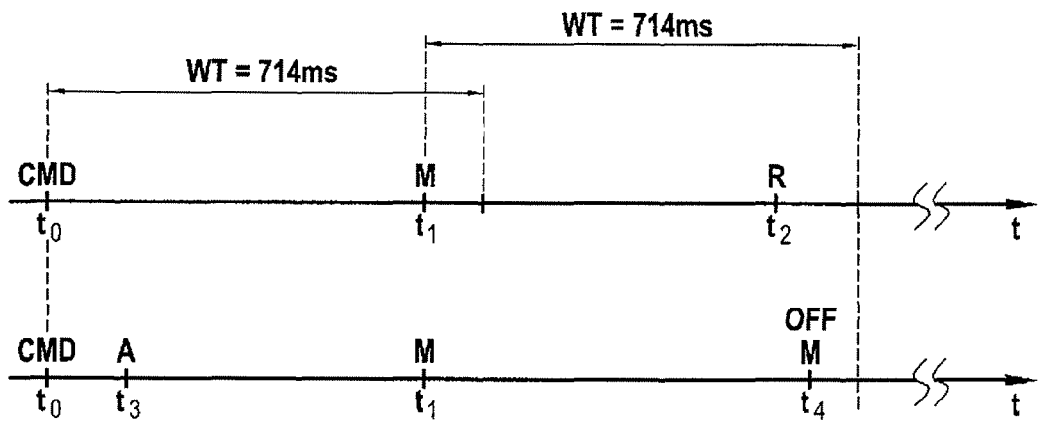
FIG. 3 illustrates two timelines illustrating the operation of the reader of FIG. 1, in keeping with a second embodiment of the invention.

In a second embodiment, whereof the operating is illustrated in FIG. 3, the reader 1 comprises a counter configured to count the number of receipt of protocol bytes M originating from the smart card 2. The reader 1 initialises the counter during the sending of a command to the smart card 2 and reinitialises it on receipt of a response R. When the counter reaches a predetermined threshold without receipt of a response R from the smart card 2, the reader 1 cuts the power signal of the smart card 2. The operating of the reader 1 of this embodiment is therefore different to the embodiment of FIG. 2 since the reader does not count the passage of time but the number of protocol bytes M received.

The operating of the reader 1 according to this second embodiment is illustrated in FIG. 3, in the case where the reader 1 cuts the power of the card after two protocol bytes M and or the duration WT is equal to 714 ms.

The upper timeline of FIG. 3 corresponds to the operating of the card 1 in the absence of attack. The reader 1 sends a command CMD at the instant $t_0$ and initialises its counter. The command CMD needs a time of execution of between one and two times the duration WTWWT. The smart card 2 begins to execute the command CMD received. At the instant $t_1$, shortly before expiration of the duration WT, the smart card 2 has nit yet finished executing the command CMD and therefore sends a protocol byte M to ask for more time of the reader 1. Next, at the instant $t_2$, the execution of the command CMD is terminated and the smart card 2 responds by a response R. The response R is therefore received by the reader 1 at the instant $t_2$, prior to receipt of a second protocol byte M. The reader 1 therefore does not cut the power signal of the smart card 2.

The lower timeline of FIG. 3 corresponds to the event where the smart card 2 undergoes an attack the effect of which is to have it execute an infinite loop. The reader 1 also sends the command CMD at the instant $t_0$ and initialises its counter. Then, at the instant $t_3$, the smart card 2 undergoes an attack A and enters an infinite loop.

At the instant $t_1$, the smart card 2 sends a protocol byte M as in the case of the upper timeline. However, in this case the smart card 2 does not fully execute the command CMD due to the attack A and therefore does not respond by a response R at the instant $t_2$.

As the smart card 2 is designed to communicate according to the standard ISO 7816, a novel protocol byte M is sent to the reader 1 at the instant $t_4$. The reader 1 then confirms, at the instant $t_4$, that two protocol bytes M have been received without receipt of a response R and therefore cuts the power of the smart card 2 to reinitialise it. The infinite loop is therefore interrupted.

In this embodiment, the reader 2 therefore carries out attacks on a smart card 1 which has been asked to execute a command whereof the duration of execution is between one and two times the duration WT, while preventing the card from entering an uninterrupted infinite loop. By changing the number of protocol bytes M counted before cutting the power of the card, the reader 2 can be used for commands whereof the execution needs any duration.

Figure 4:
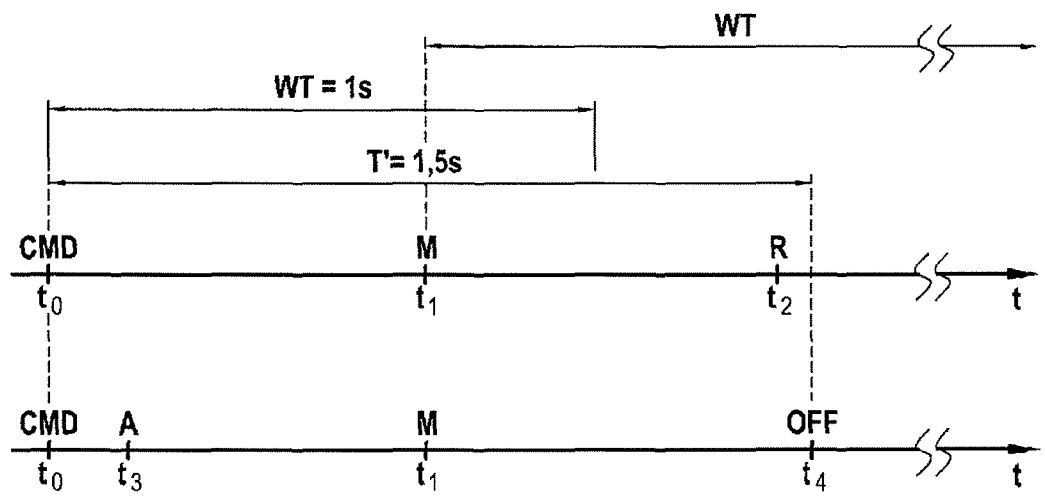
FIG. 4 illustrates two timelines illustrating the operation of the reader of FIG. 1, in keeping with a third embodiment of the invention.

In a third embodiment, whereof the operating is illustrated in FIG. 4, the reader 1 comprises a first counter and a second counter, configured to be incremented with the time. The reader 1 triggers the two counters during the sending of a command to the smart card 2.

The first counter is a counter whereof the operating complies with the standard ISO 7816. In other words, the first counter is reinitialised in response to the receipt of a protocol byte M of the smart card 2 and, when the first counter reaches a predetermined value corresponding to the expiration of the duration WT without receipt of a response R from the smart card 2 or of the protocol byte M, the reader 1 cuts the power signal of the smart card 1.

The second counter is a counter intended to measure a different duration T' of WT from the sending of the command CMD. When the second counter reaches a predetermined value corresponding to the expiration of the duration T' without receipt of a response R from the smart card 2, the reader 1 cuts the power signal of the smart card 1, independently of the receipt of a protocol byte M.

The operating of the reader 1 according to this third embodiment is illustrated in FIG. 4, in the event of a duration T'=1.5 second and a duration WT equal to one second.

The upper timeline of FIG. 4 corresponds to the operating of the card 1 in the absence of attack. The reader 1 sends a command CMD at the instant $t_0$ and initialises its two counters. The command CMD needs a time of execution between the duration WT and the duration T' of 1.5 seconds. The smart card 2 begins to execute the command CMD received. At the instant $t_1$, shortly before the expiration of the duration WT, the smart card 2 has not yet finished executing the command CMD and therefore sends a protocol byte M to ask for more time to the reader 1. Next, at the instant $t_2$, the execution of the command CMD is terminated and the smart card 2 responds by a response R. The response R is therefore received by the reader 1 at the instant $t_2$, prior to expiration of the duration T'=1.5 second. The reader 1 therefore does not cut the power signal of the smart card 2.

The lower timeline of FIG. 4 corresponds to cases where the smart card 2 undergoes an attack A the effect of which is to have it execute an infinite loop. The reader 1 also sends the command CMD at the instant $t_0$ and initialises its counters. Then, at the instant $t_3$, the smart card 2 undergoes an attack A and enters an infinite loop.

At the instant $t_1$, the smart card 2 sends a protocol byte M as in the case of the upper timeline. However, in this case, the smart card 1 does not fully execute the command CMD due to the attack A and therefore does not respond by a response R at the instant $t_2$.

The reader 1 notes, at the instant $t_4$, the expiration of the duration T' without receipt of a response R. Therefore, at the instant $t_4$, the reader 1 cuts the power of the smart card 2 to reinitialise it. The infinite loop is therefore interrupted.

In this embodiment also, the reader 1 therefore makes attacks on a smart card 1, while preventing the card from entering an uninterrupted infinite loop.

Figure 5:
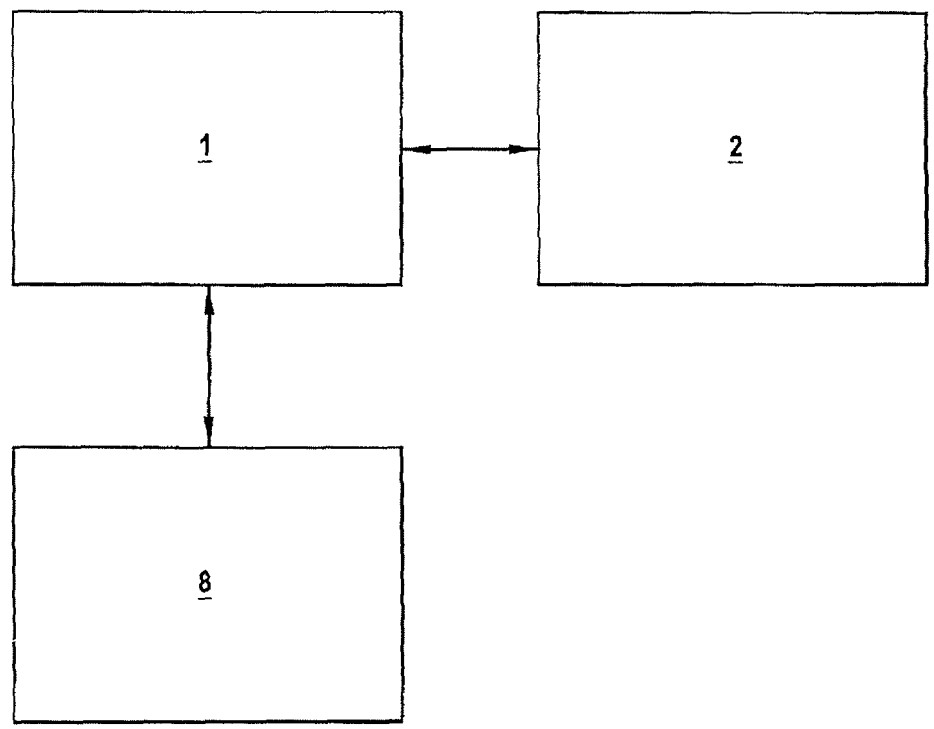
FIG. 5 illustrates a smart card reader according to the invention, a smart card and an infinite loop detection device.

FIG. 5 illustrates a variant of FIG. 1, in which the reader 1 is also attached to an infinite loop detection device 8. In this variant, the reader 1 is configured to cut the power of the smart card 2 in response to the receipt of a cutting message of the infinite loop detection device 8.

A variant of the third embodiment described hereinabove in reference to FIG. 4 consists of placing the second counter in the infinite loop detection device 8 external to the reader 1. In this case, at the instant $t_0$, the infinite loop detection device 8 triggers the second counter either in response to a message of the reader 1 which signals the sending of the command, or because it observes the link between the reader 1 and the smart card 2 and confirms the sending of the command CMD. At the instant $t_4$, the infinite loop detection device 8 sends a cutting message to the reader 1. If no response R has been received (instant $t_2$), the reader 1 cuts the power signal of the card 1 in response to the receipt of the cutting message.

In a fourth embodiment, the infinite loop detection device 8 is a pattern detector configured to analyse an analysis signal AS originating from the smart card 2.

It is known in fact that physical interactions of an onboard electronic module, for example a microcontroller module for smart card, with its external environment are dependent on the operations performed by the module as well as the values of the variables handled by these operations. Examples of such interactions are the consumption of current of the module (signal PA), electromagnetic radiation (signal EMA) or else radio frequency signal (signal RFA) which allows a contactless card to be fed and communicate.

Figure 6:
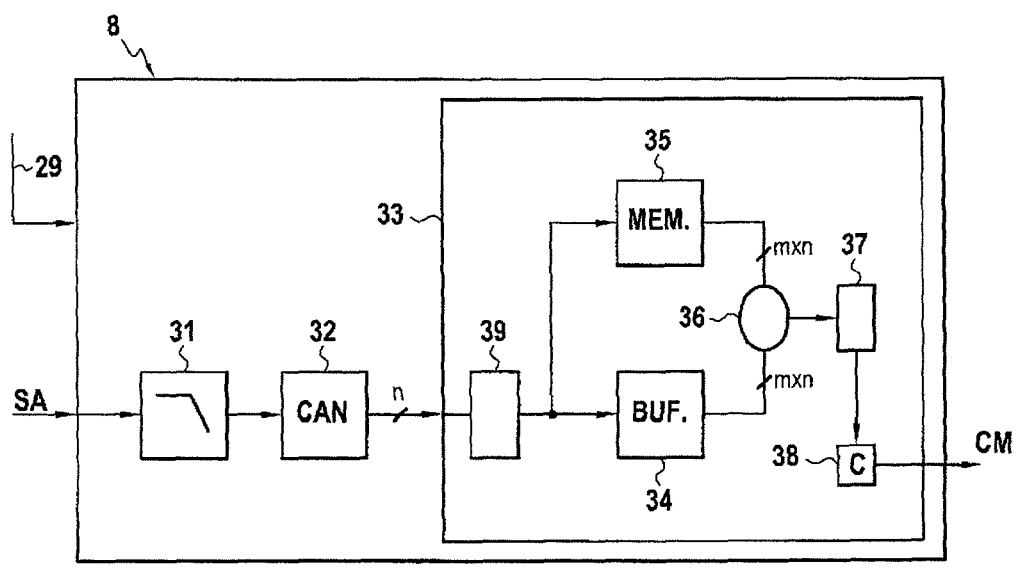
FIG. 6 illustrates in more detail an exemplary embodiment of the infinite loop detection device of FIG. 5, and FIGS. 7 and 8 are graphs which illustrate the operation of the infinite loop detection device of FIG. 6.

Therefore, in FIG. 6 which illustrates the infinite loop detection device 8 in more detail, SA is noted, the analysis signal measured to analyse the operations performed by the smart card 2. The analysis signal AS can be for example consumption of current, electromagnetic radiation or the radio frequency signal of the smart card 2. The signal SA is provided to the infinite loop detection device 8.

The infinite loop detection device 8 of FIG. 6 is a pattern detector which comprises a filter 31, an analog/digital converter 32 and an analysis circuit 33.

The filter 31 performs analog processing on the analysis signal AS, typically a low-pass filtering. The filtered signal is digitised on n bits by the analog/digital converter 32.

The analysis circuit 33 comprises a buffer memory 34, another memory 35, a comparison unit and a counter 38. In the embodiment illustrated, the comparison unit comprises an inter-correlation unit 36 performing an inter-correlation algorithm and a threshold detector 37 for measuring the resemblance between two curves.

The buffer memory 34 stores on the fly m samples of n bits originating from the analog/digital converter 32, on the principle of the "first in, first out". Therefore, the contents of the buffer memory 34 illustrate, in the form of m samples of n bits, the most recent part of the analysis signal AS.

The memory 35 stores a pattern of m values of n bits, corresponding to the event which must be detected on the analysis signal AS.

The inter-correlation unit 36 determines a degree of resemblance between the curve stored in the buffer memory 34 and the curve stored in the other memory 35 by using an inter-correlation algorithm. Next, the degree of resemblance is compared to a predetermined threshold S in the threshold detection unit 37. If the degree of resemblance is less than the threshold S, it is considered that the analysis signal AS is different to the stored pattern in the memory 35 and the counter 38 is not incremented. On the contrary, if the degree of resemblance is greater than the threshold S, it is considered that the analysis signal AS corresponds to the stored pattern in the memory 35 and the counter 38 is incremented.

The analysis circuit 33 preferably comprises a transformation unit 39 located between the outlet of the analog/digital converter 32 and the input of the memories 34 and 35. The transformation unit 39 performs a Fourier transformation of type FFT. Knowing that it is easier to use an inter-correlation algorithm in the frequential field than the temporal field makes the work of the comparison unit easier.

The analysis circuit 33 is created for example by a programmable logic circuit of type FPGA. As a variant, this is a digital signal processor (DSP) configured to utilise the functions of the buffer memory 34, of the other memory 35 and of the comparison unit.

When the counter 38 reaches a predetermined value, the infinite loop detection device 8 sends a cutting message CM to the reader 1.

When operating, the infinite loop detection device 8 alternates between two operating modes:

In a first operating mode, a pattern to be detected is stored in the memory 35.

In a second operating mode, the stored pattern in the memory 35 is searched for by comparison with the portion of signal stored in the buffer memory 34, as described previously.

Shifting from one operating mode to the other is controlled for example by the reader 1.

Figure 7:
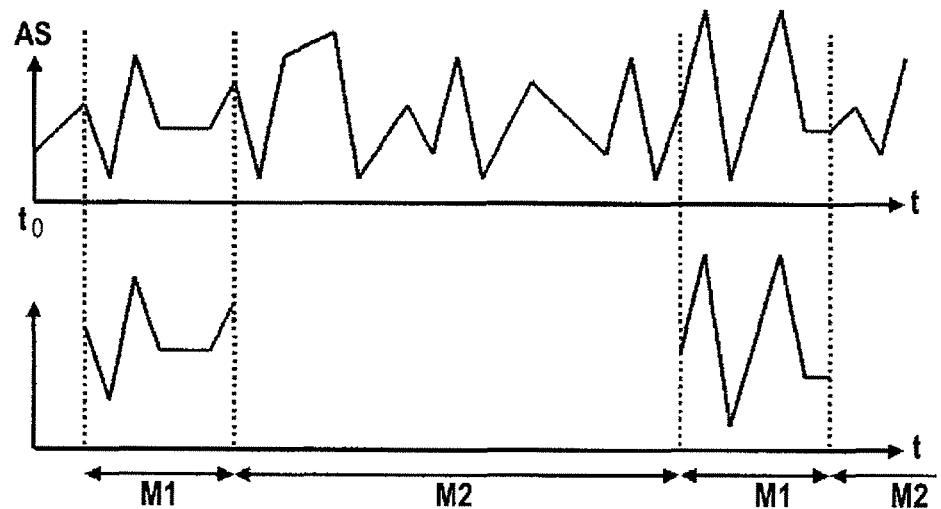
Figure 8:
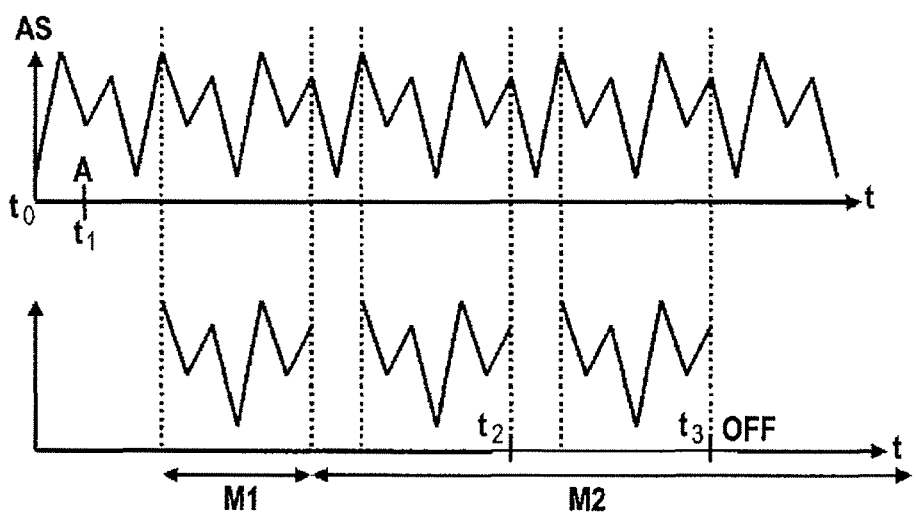

FIGS. 7 and 8 illustrate the operating of the reader 1 and of the infinite loop detection device 8 in this fourth embodiment.

FIG. 7 corresponds to the operating in the absence of attacks. The reader 1 sends a command CMD at the instant $t_0$ and the activity of the smart card 2 during the execution of this command is revealed by the analysis signal AS.

In parallel with sending the command CMD, the reader 1 asks the infinite loop detection device 8 to record a pattern in its memory 35, according to the first operating mode, noted M1. Next, the reader 1 asks the infinite loop detection device 8 to function according to the second operating mode, noted M2, in which the infinite loop detection device 8 compares the stored pattern to the analysis signal AS. As the smart card 2 executes the command CMD without infinite loop, no repetition of the stored pattern is detected in the analysis signal AS. The counter 38 is therefore not incremented and the cutting message CM is not sent. The reader 1 therefore does not cut the power of the smart card 2.

FIG. 8 corresponds to the operating in the event of attacks. Therefore, the reader 1 sends a command CMD at the instant $t_0$ and the smart card undergoes an attack at the instant $t_1$, which causes execution of an infinite loop. The activity of the smart card 2 during the execution of this infinite loop is revealed by the analysis signal AS.

As in the case of FIG. 7, the infinite loop detection device 8 first functions according to the first operating mode, noted M1, and records a pattern in its memory 35. Next, in the second operating mode, noted M2, the infinite loop detection device 8 compares the stored pattern to the analysis signal AS. As the smart card 2 executes the infinite loop, repetition of the stored pattern is detected in the analysis signal AS at the instants $t_2$, $t_3$, . . . . The counter 38 is therefore incremented. When the counter reaches a predetermined value, the cutting message CM is sent. In the example illustrated, the cutting message CM is sent after the stored pattern is detected twice, at the instant $t_3$. The reader 1 therefore cuts the power of the smart card 2 at this instant.

In the preceding embodiments, the power of the smart card 2 is cut when a condition suggesting that the smart card 2 executes an infinite loop is fulfilled. In the embodiment of FIGS. 5 to 8, the infinite loop detection device, due to analysis of the activity of the smart card, effectively detects the repetition of a loop. If this loop is repeated a predetermined number of times, it is considered that this is an infinite loop and the power signal of the smart card 2 is cut. This embodiment therefore more quickly and reliably detects an infinite loop.

In the different embodiments described hereinabove, the reader 1 cuts the power of the smart card 2 in response to the detection of a malfunctioning condition of the smart card. In the embodiment of FIG. 2, the malfunctioning condition is the expiration of a duration T' less than the duration WT determined according to the standard ISO 7816, for example 200 ms, without receipt of a response R from the smart card 2. In the embodiment of FIG. 3, the malfunctioning condition is the receipt of a predetermined number of predetermined messages, for example of protocol bytes M, without receipt of a response R from the smart card 2. In the embodiment of FIG. 4, the malfunctioning condition is the expiration of a duration T', which can be less or greater than the duration WT, without receipt of a response R from the smart card 2, whereas another counter can cut the power as prescribed by the standard ISO 7816. Finally, in the embodiment of FIG. 5, the malfunctioning condition is the receipt of a cutting message of the infinite loop detection device 8. The infinite loop detection device 8 can send the cutting message after the expiry of a predetermined duration T', similarly to the embodiment of FIG. 4, or in response to the detection of an infinite loop by analysis of the activity of the smart card.

The reader 1 and the infinite loop detection device 8 can be two distinct apparatuses connected for example by a cable. As a variant, the same apparatus can comprise the reader 1 and the infinite loop detection device 8.

In the embodiments described previously, the card (otherwise said, its electronic component) is reinitialised by cutting of the power of the card by the reader. In general, the reader also sends a reinitialisation signal to the card when it is then repowered by the reader. This is only one example of an embodiment for reinitialisation (or, otherwise said, initialisation) of the card by the reader. So, as a variant, this reinitialisation can be done by the reader sending a reinitialisation signal to the card, without cutting the power of the card.

The invention claimed is:

1. A smart card reader configured to determine a duration WT (Waiting Time) in keeping with the ISO 7816 standard and send commands to a smart card, the reader comprising a detector for detecting a malfunctioning condition of the smart card and configured to command reinitialization of the card when the malfunctioning condition is fulfilled,
wherein the malfunctioning condition is different from a counter reaching a value, the counter being configured to be incremented with the time from the sending of a command to the smart card, and the value corresponding to the duration WT elapsed from the sending of the command or reinitialization of the counter in response to receiving a protocol message of the smart card, and wherein the malfunctioning condition comprises execution of an infinite loop by the smart card.

2. The reader as claimed in claim 1, further comprising a counter configured to be incremented with the time from the sending of a command to the smart card, in which the malfunctioning condition is reached, by the counter, a value corresponding to a period less than the duration WT elapsed from the sending of the command, without receiving a response of the smart card.

3. The reader as claimed in claim 1, wherein the malfunctioning condition is the receipt of a predetermined number of protocol messages of the smart card.

4. The reader as claimed in claim 1, further comprising a first counter and a second counter configured to be incremented with the time from the sending of the command to the smart card,
wherein the malfunctioning condition comprises reaching, by the first counter, a value corresponding to the duration WT elapsed from the sending of the command or the reinitialization of the first counter in response to receiving the protocol message from the smart card, without receiving a response of the smart card,
the malfunctioning condition further comprising reaching, by the second counter, a value corresponding to a period different to the duration WT elapsed from the sending of the command, without receiving a response of the smart card.

5. The reader as claimed in claim 1, wherein the malfunctioning condition comprises the receipt of a cutting message originating from an infinite loop detection device.

6. A system comprising a smart card reader as claimed in claim 5 and an infinite loop detection device configured to send a cutting message to the smart card reader.

7. The system as claimed in claim 6, wherein the infinite loop detection device comprises a counter configured to be incremented with the time from the sending of a command of the reader to a smart card, the infinite loop detection device being configured to send the cutting message when the counter reaches a value corresponding to a period different to the duration WT elapsed from the sending of the command.

8. The system as claimed in claim 6, wherein the infinite loop detection device is configured for detecting an execution of an infinite loop by a smart card as a function of an analysis signal originating from the smart card and for sending the cutting message in response to the detection.

9. The system as claimed in claim 6, further comprising a smart card configured to regularly send protocol bytes 0x60 of the ISO 7816 standard during an execution of a command requiring more time than the duration WT.

10. A power process used by a smart card reader configured to determine a duration WT (Waiting Time) in keeping with the ISO 7816 standard and sending commands to a smart card, comprising:
detecting a malfunctioning condition of the smart card; and
commanding reinitialization of the smart card when the malfunctioning condition is fulfilled,
wherein the malfunctioning condition is different from a counter reaching a value, the counter being configured to be incremented with the time from the sending of a command to the smart card, and the value corresponding to the duration WT elapsed from the sending of the command or reinitialization of the counter in response to receiving a protocol message of the smart card, and wherein the malfunctioning condition comprises an execution of an infinite loop by the smart card.

* * * * *